United States Patent [19]

Vallance

[11] Patent Number: 5,014,085
[45] Date of Patent: May 7, 1991

[54] LENS SHUTTLE MECHANISM FOR MICROFILM CAMERA

[75] Inventor: L. Vallance, W. Lothiam, United Kingdom

[73] Assignee: Unisys Corporation, Blue Bell, Pa.

[21] Appl. No.: 497,488

[22] Filed: Mar. 22, 1990

[30] Foreign Application Priority Data

Jun. 7, 1989 [GB] United Kingdom ............... 89 13123

[51] Int. Cl.⁵ .................... G03B 27/32; G03B 27/52
[52] U.S. Cl. ............................ 355/64; 355/55; 355/46; 355/52
[58] Field of Search .............. 355/64, 52, 55, 46, 355/65, 24

[56] References Cited

U.S. PATENT DOCUMENTS

| | | | |
|---|---|---|---|
| 4,087,173 | 5/1978 | Beery | 355/65 |
| 4,374,618 | 2/1983 | Howard | 355/65 |
| 4,426,149 | 1/1984 | Kuemmel et al. | 355/55 |
| 4,737,825 | 4/1988 | Davis | 355/46 |

FOREIGN PATENT DOCUMENTS

| | | |
|---|---|---|
| 0092997 | 11/1983 | European Pat. Off. |
| 0122816 | 10/1984 | European Pat. Off. |
| 0137283 | 4/1985 | European Pat. Off. |
| 0178077 | 4/1986 | European Pat. Off. |
| 1476583 | 6/1977 | United Kingdom |
| 1503162 | 3/1978 | United Kingdom |
| 2091902A | 8/1982 | United Kingdom |
| 2106664A | 4/1983 | United Kingdom |
| 2163867A | 3/1986 | United Kingdom |

*Primary Examiner*—Monroe H. Hayes
*Attorney, Agent, or Firm*—Whitham & Marhoefer

[57] ABSTRACT

This disclosure relates to a lens shuttle mechanism for a microfilm camera. The lens system (25) is mounted in a lens carrier which is itself mounted for reciprocating motion in a film gate casting (10) by means of four leaf springs (31,35,41,45). The two outer springs (31 and 35) are centrally fixed to the casting (10) while the two inner springs (41 and 45) are centrally fixed to the lens carrier. The free ends of all four springs are fixed to spacers (51 and 52). The lens carrier includes a threaded bore (71) which receives a lead screw (72). A servo motor (76) is provided to rotate the lead screw (72) in both directions alternately.

9 Claims, 3 Drawing Sheets

LENS SHUTTLE MECHANISM FOR MICROFILM CAMERA

BACKGROUND OF THE INVENTION

1. Field of the Invention

This invention relates to shuttle mechanisms and is particularly applicable to the lens shuttle mechanism for a microfilm camera.

A requirement in many shuttle mechanisms is to provide accurate linear motion of a shuttle member relative to a base member, and in particular in a microfilm camera it is necessary to provide linear motion of the lens while maintaining sharp focus.

2. Description of the Prior Art

One particular known lens shuttle mechanism is based on the Watt straight line mechanism. The lens is centrally situated on a cross member which is carried by leaf springs or flexures of equal length attached to respective ends of the cross member so that they extend perpendicular to the cross member in opposite directions. The outer ends of the two flexures are molded into the camera body and the desired linear motion of the lens is produced by a connecting rod attached to the cross member and is driven by means of a crank arm fitted to a servo motor. This mechanism suffers from the following disadvantages:

1. The ends of the flexures which are molded into the camera body are, due to their distance apart, affected by any dimensional instability of the camera body. This has to be made extremely rigid, as any movement of the flexures is detrimental to the resolution of the camera.
2. The performance of the mechanism is affected by the tolerances on the camera body.
3. The focal plane requires adjustment using a dial gauge and a surface plate.
4. Any movement of the servo motor due to reactionary forces or vibration results in a positional error.

SUMMARY OF THE INVENTION

The present invention is applicable to any apparatus in which linear reciprocating motion is required to be produced between a shuttle member and a base member. In accordance with the invention the shuttle member is mounted on the base member by means of a parallel mechanism comprising four leaf springs. Two of said leaf springs are attached to the base member so that end portions of the two springs extend away from the base member in opposite directions and are secured at, or in the region of, their free ends to two spacers The other two leaf springs are attached to the shuttle member so that end portions of said other two springs extend away from the shuttle member in opposite directions and are secured at, or in the region of, their free ends to the spacers. Means are provided to produce relative reciprocating motion between the shuttle member and the base member.

As already stated, the invention is particularly applicable to a lens shuttle mechanism for a microfilmer camera and the invention will be described particularly hereinafter in connection with its use in a microfilm camera. In such a camera the base member is constituted by the film gate casting and the shuttle member is constituted by the lens carrier.

Preferably the first two mentioned springs are attached to the film gate casting so that in the rest position they are parallel to one another and are attached centrally so that each spring extends the same distance in both directions from the points of attachment. It is to be understood that each spring could be constituted by two separate springs extending in opposite directions from the casting, but accurate assembly is facilitated by using a single spring in each case. Preferably four points of attachment are used for each spring, the four axes of attachment of one spring being coaxial with the four axes of attachment of the other spring.

Similarly the other two springs are attached to the lens carrier so that in the rest position they are parallel to one another and are attached centrally so that each spring extends the same distance in both directions from the points of attachment. Once again it is to be understood that each spring could be constituted by two separate springs extending in opposite directions from the carrier, but accurate assembly is facilitated by using a single spring in each case.

Preferably the four springs are all of identical size and shape, and each end of each spring is preferably attached to the respective spacer at two points. Preferably one set of four points of attachment of the four springs to one spacer are coaxial and similarly the other set of four points of attachment are also coaxial. Similar considerations apply to the other spacer.

When the mechanism is assembled, the four axes of attachment of the carrier are coaxial with the four axes of attachment of the casting.

It is to be understood that the spacers are rigidly connected to the four springs but are otherwise unsupported so that they are free to move in any direction except as restricted by their attachments to the springs. With this arrangement, movement of the lens carrier with respect to the film gate casting is restricted to a straight line.

Preferably the two springs connected to the lens carrier are situated between the two springs attached to the film gate casting, and the spacing between the outer ends of one pair of the springs attached respectively to the lens carrier and the film gate casting is the same as the spacing between the outer ends of the other pair of adjacent springs. Preferably when the lens is centrally located with respect to the film gate, the four springs are all parallel.

Any desired mechanism may be used to produce relative reciprocating movement between the lens carrier and the film gate casting, but it is preferred that this movement should be produced by means of a lead screw attached to the film gate casting through a ball bearing, and engaging in a thread in the lens carrier. A servo motor is provided to rotate the lead screw in alternate directions, thus producing reciprocating motion of the lens with respect to the film gate.

Some advantages of a mechanism in accordance with the invention as applied to a microfilm camera are as follows:

1. The leaf spring or flexures are fastened directly to the members whose relative motion is being controlled and the need for a large rigid supporting structure is eliminated.
2. Because the spacers are unsupported, the length of leaf spring required for a given movement is halved, thus increasing rigidity in the direction of the lens axis.
3. The position of the lens relative to the film gate is determined solely by the angular position of the lead screw.

4. The unit can be jig-assembled, thus eliminating final adjustments and ensuring that the lens move in a straight line and parallel to the focal plane.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
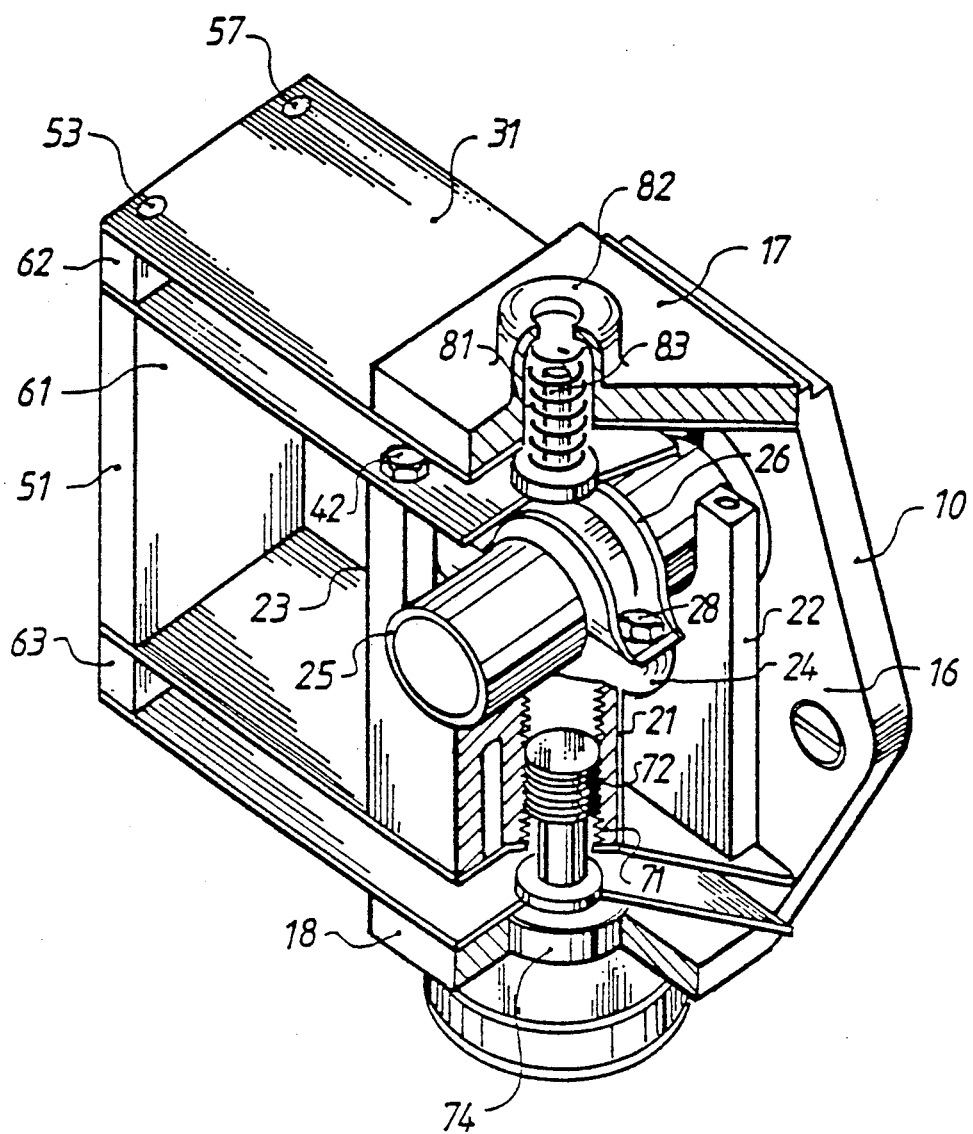
FIG. 1 is a perspective view of a lens shuttle mechanism in accordance with the invention.
Figure 2:
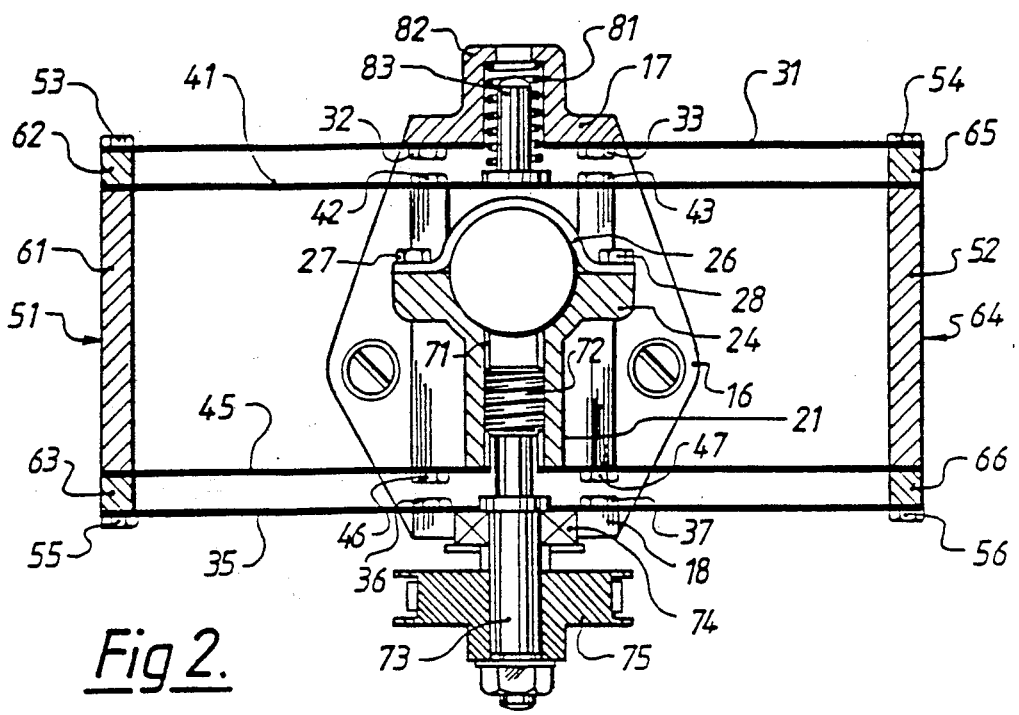
FIG. 2 is a front elevation, partly in section, of the mechanism shown in FIG. 1.
Figure 3:
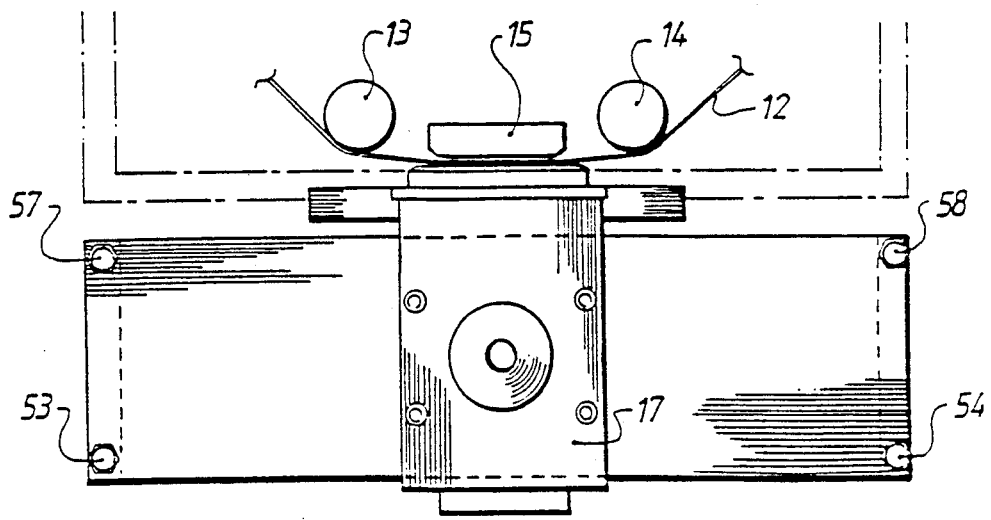
FIG. 3 is a plan view of the mechanism shown in FIGS. 1 and 2.
Figure 4:
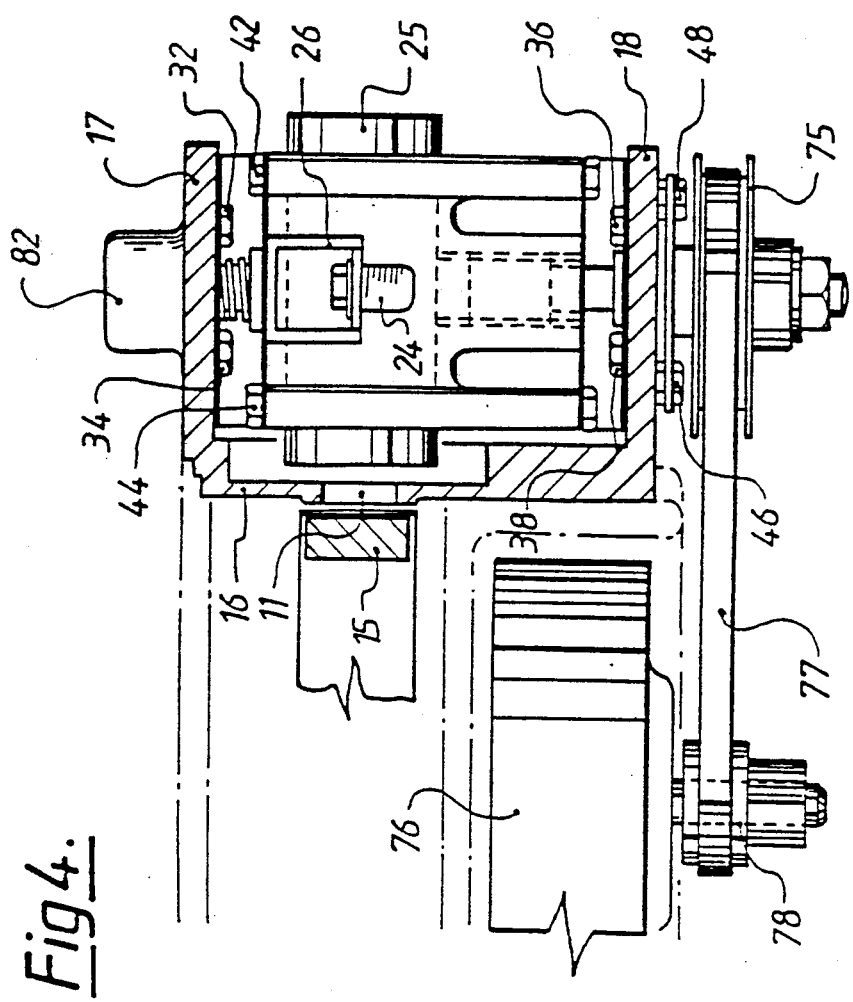
FIG. 4 is a side view, partly in section, of the mechanism shown in FIGS. 1, 2 and 3.

The mechanism illustrated includes a film gate casting 10 which includes a film gate 11 (FIG. 4). A film 12 (FIG. 3) is driven past the film gate being guided by rollers 13 and 14 and a rear guide plate 15. The film gate casting includes a back-plate 16 and upper and lower members 17 and 18 respectively. The lens carrier includes a central pillar 21 surrounded by four walls, two of which are shown at 22 and 23 in FIG. 1. The central pillar is formed with a lens support 24, and a lens system 25 is held in the support 24 by means of a clamp 26 which is secured to the support by bolts 27 and 28.

A leaf spring 31 is secured to the underside of the top member 17 by means of four bolts, three of which are visible at 32, 33 and 34. Similarly a leaf spring 35 is secured to the upper side of the lower member 18 by means of four bolts three of which are visible at 36, 37 and 38. The lens carrier is secured to a spring 41 by means of four bolts, three of which are visible at 42, 43 and 44. Similarly a leaf spring 45 is secured to the lens carrier by means of four bolts, three of which are visible at 46, 47 and 48.

The outer ends of the four springs, 31, 35, 41, 45 are secured by spacers 51 and 52 by means of bolts, six of which are visible at 53-58. Each of the spacers consists of three parts. Thus the spacer 51 includes a central portion 61, an upper portion 62 and a lower portion 63. Similarly the spacer 52 includes a central portion 64, an upper portion 65, and a lower portion 66. As can be seen, the spring 41 is clamped at one end between the spacer portions 61 and 62 and at the other end between the space portions 64 and 65. The space portions 61 and 62 and 64 and 65 are shown in Figure two as being equal in length. It is to be understood that this is a preferred arrangement and that inequality in their respective lengths is also acceptable in the present invention. Similarly the spring 45 is clamped at one end between the portions 61 and 63 and at the other end between the portions 64 and 66.

The pillar is provided with a central bore 71 which is threaded to receive a lead screw 72. The lead screw 72 is formed on a shaft 73 which is rotatable in a ball bearing 74 fixed in the lower member 18 of the film gate casting 10. The ball bearing allows the lead screw to rotate, but prevents it from moving axially with respect to the casting. The shaft 73 is rotated by means of a pulley 75 which is coupled to a servo motor 76 by means of a belt 77 and a further pulley 78. Rotation of the lead screw 72 in the threaded bore 71 in one direction causes the lens carrier to move upwardly (as seen if FIG. 1) with respect to the film gate casting, whereas rotation of the lead screw in the opposite direction causes the lens carrier to move downwardly with respect to the film gate casting. This movement is of course effective to move the optical axis of the lens system 25 along the film gate.

To compensate for any backlash which may be present in the lead screw drive system the lens carrier is urged downwardly with respect to the film gate casting by means of a spring 81. The spring 81 is supported on a spigot 83 secured to the lens carrier and is housed in a dome 82 which forms part of the upper member 17 of the casting 10.

It will be understood that, when the lead screw is rotated so that the lens carrier moves upwardly with respect to the film gate casting, the inner ends of the springs 31 and 41 will approach each other. At the same time the inner ends of the springs 35 and 45 will be moved further apart. Since the spacers 51 and 52 are free to move, each of these will be moved upwardly by a distance equal to half the distance traveled by the lens carrier with respect to the film gate casting. At the same time the spacers 51 and 52 will be moved inwardly a short distance towards each other, while remaining parallel to each other. It will also be understood that the two extending portions of each pair of adjacent springs will form part of the sides of isosceles triangles. Thus the lens carrier will be constrained to move with respect to the film gate casting along a straight line path.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A shuttle mechanism comprising;

a base member;

a shuttle member;

a first pair of spaced apart leaf springs, each spring of said first pair attached to said base member with the ends of said spring extending away from said base member in opposite directions and with each end of said spring respectively secured to a spacer at or in the region of its free end; a second pair of spaced apart leaf springs, each spring of said second pair attached to said shuttle member with the ends of said spring extending away from said shuttle in opposite directions and with each end of said spring respectively secured to a spacer at or in the region of its free end; and means to produce selective reciprocating movement between said shuttle member and said base member.

2. A shuttle mechanism according to claim 1, wherein said two first mentioned leaf springs are attached centrally to said base member so that each spring extends the same distance in both directions from the points of attachment and wherein at least the central portions of the two springs are parallel to one another.

3. A shuttle mechanism according to claim 2, wherein four points of attachment are used for each spring, the four axes of attachment of one spring being respectively coaxial with the four axes of attachment of the other spring.

4. A shuttle mechanism according to claim 2 wherein the other two of said leaf springs are attached centrally to said shuttle member so that each spring extends the same distance in both directions from the points of attachment and wherein at least the central portions of said two other springs are parallel to one another.

5. A shuttle mechanism according to claim 1, wherein the four leaf springs are all of similar size and shape and are attached to said spacers so that their free ends are contained in two respective parallel planes.

6. A shuttle mechanism according to claim 1, wherein the two leaf springs attached to one of said members are located between the two springs attached to the other of said members.

7. A shuttle mechanism according to claim 6, wherein the end portions of the springs are secured to the spacers so that the spacing between the outer ends of one pair of adjacent springs is the same as the spacing between the outer ends of the other pair of adjacent springs.

8. A shuttle mechanism according to claim 1, wherein said means for producing relative reciprocating movement are constituted by a lead screw rotatable in, but not axially movable with respect to, one of said members, and engaging in an internally threaded member in the other of said members.

9. A shuttle mechanism according to claim 8, wherein said lead screw is mounted in a ball bearing secured to said base member and is rotatable in alternate directions by means of a servo motor.

* * * * *